(12) United States Patent
Shibamoto

(10) Patent No.: US 9,162,531 B2
(45) Date of Patent: Oct. 20, 2015

(54) MOTORCYCLE TIRE

(71) Applicant: Sumitomo Rubber Industries, Ltd., Kobe-shi, Hyogo (JP)

(72) Inventor: Shohei Shibamoto, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 325 days.

(21) Appl. No.: 13/768,130

(22) Filed: Feb. 15, 2013

(65) Prior Publication Data

US 2013/0228256 A1 Sep. 5, 2013

(30) Foreign Application Priority Data

Mar. 1, 2012 (JP) ................................. 2012-045868

(51) Int. Cl.
*B60C 11/117* (2006.01)
*B60C 11/03* (2006.01)

(52) U.S. Cl.
CPC ......... *B60C 11/0304* (2013.04); *B60C 11/0302* (2013.04); *B60C 11/033* (2013.04); *B60C 2011/036* (2013.04); *B60C 2011/0348* (2013.04); *B60C 2011/0372* (2013.04); *B60C 2011/0376* (2013.04); *B60C 2200/10* (2013.04)

(58) Field of Classification Search
CPC ........................ B60C 2200/10; B60C 2200/12
USPC ..................................................... 152/209.11
See application file for complete search history.

(56) References Cited

U.S. PATENT DOCUMENTS

2009/0255615 A1* 10/2009 Ishiyama et al. .......... 152/209.11
2010/0282390 A1* 11/2010 Mariani et al. ................ 152/454

FOREIGN PATENT DOCUMENTS

| JP | 61-036002 | * | 2/1986 |
| JP | 09-039516 | * | 2/1997 |
| JP | 09-048214 | * | 2/1997 |
| JP | 2001-30719 A | | 2/2001 |
| JP | EP1826026 | * | 8/2007 |
| JP | 2009-101743 | * | 5/2009 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A motorcycle tire comprises a tread portion provided with a plurality of inner inclined grooves and inclined narrow grooves in both sides of a tire equator, wherein each inner inclined groove extends from an axially inner end to the outer end with an angle of 0-20 degrees with respect to a tire circumferential direction, the inner end of the inner inclined groove is located in a developed length within 5% of a tread half developed-width from the tire equator, each inner inclined groove has a circumferential length of 70-85% of a first pitch, each inclined narrow groove with a groove width of 0.5-2.0 mm is provided between circumferentially adjacent inner inclined grooves and has an angle with respect to a circumferential direction of the tire larger than that of the inner inclined groove.

9 Claims, 3 Drawing Sheets

MOTORCYCLE TIRE

BACKGROUND OF THE INVENTION

1. Field of the Invention

The present invention relates to a motorcycle tire in which a thermal degradation of a tread portion may be prevented while maintaining turning performance as well as tire life.

2. Description of the Related Art

Recent years, since motorcycles tend to have high power engines, a motorcycle tire subjected to high load and power tends to have tread portions with a high land ratio. Typically, such a motorcycle tire may improve stability in straight running, wear resistance performance and tire life. Since the tread portion of the motorcycle tire, however, is liable to have low heat dissipation due to the high land ratio, thermal degradation tends to generate on the tread portion during continued running with high tire load.

JP-2001-030719-A1 discloses a motorcycle tire having a tread portion with a plurality of inclined grooves each of which extends from a tread center portion toward the tread edge and has a maximum groove width being located at a certain area of the tread portion. However, the motorcycle tire identified above is liable to have a low turning performance due to less camber thrust.

SUMMARY OF THE INVENTION

The present invention has been worked out in light of the circumstances described above, and has a main object of providing a motorcycle tire in which a thermal degradation of the tread portion may be prevented while maintaining turning performance as well as tire life.

In accordance with the present invention, there is provided a motorcycle tire including a tread portion having a designated rotation direction, comprising the tread portion having a tread surface between a first tread edge and a second tread edge while curving in a convex arc-like manner and a tread width which is an axial distance between the first and the second tread edges being a maximum tire width, and the tread portion being provided with a plurality of inner inclined grooves and a plurality of inclined narrow grooves, each inner inclined groove extending from an axially inner end to an axially outer end toward an opposite direction to the designated rotation direction and having an angle of from 0 to 20 degrees with respect to a circumferential direction of the tire, and the axially inner end of the inner inclined groove located in a developed length within 5% of a tread half developed-width from a tire equator, the inner inclined grooves comprising a plurality of first inner inclined grooves circumferentially arranged at first pitches and each having the axially outer end toward the first tread edge and a plurality of second inner inclined grooves circumferentially arranged at second pitches and each having the axially outer end toward the second tread edge, and first inner inclined grooves and second inner inclined grooves alternately arranged in the circumferential direction of the tire, each first inner inclined groove having a circumferential length of from 70 to 85% of first pitches, and each second inner inclined groove having a circumferential length of from 70 to 85% of second pitches, each inclined narrow groove provided between circumferentially adjacent inner inclined grooves in both sides of the tire equator, the inclined narrow groove having a groove width of from 0.5 to 2.0 mm, the inclined narrow groove extending an axially inner end to an axially outer end toward the opposite direction to the designated rotation direction and having an angle with respect to a circumferential direction of the tire larger than that of the inner inclined groove, and the axially inner end of the inclined narrow groove located in a developed length within 10% of the tread half developed-width, the axially outer end of the inclined narrow groove located outside a crown portion which comes into contact on a ground under a normally inflated loaded condition that the tire is mounted on a standard wheel rim and inflated to a standard pressure and loaded with a standard tire load at a camber angle of zero, and a land ratio of the crown portion of from 85 to 95%.

DETAILED DESCRIPTION

An embodiment of the present invention will be explained below with reference to the accompanying drawings.

Figure 1:
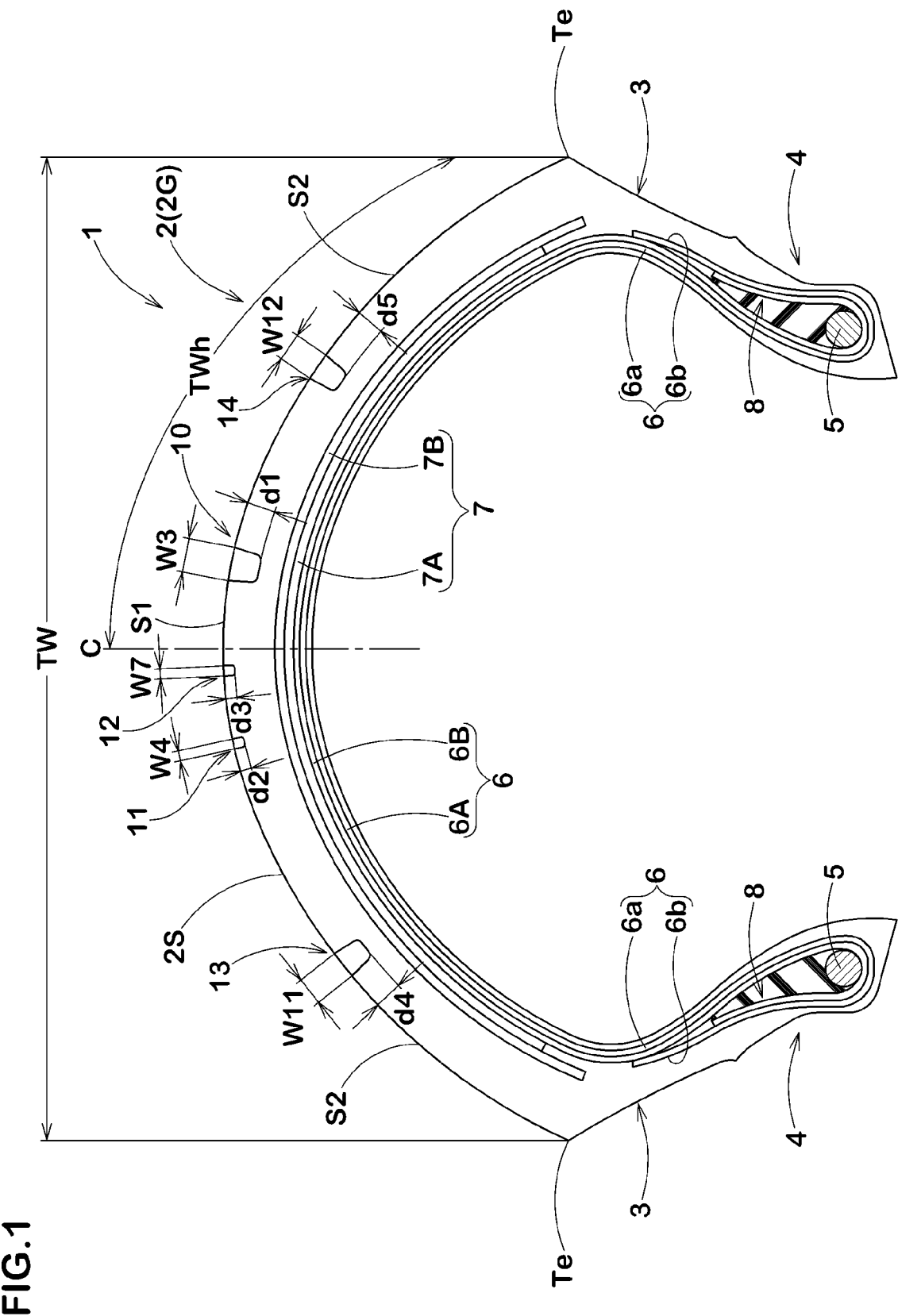
FIG. 1 is a cross sectional view of a motorcycle tire showing an embodiment of the present invention.

FIG. 1 shows a cross sectional view of a motorcycle tire (hereinafter it may simply be referred as "the tire") 1 in accordance with the present invention under a normally inflated unloaded condition.

Here, the normally inflated unloaded condition is such that the tire is mounted on a standard wheel rim (not shown) and is inflated to a standard pressure but loaded with no tire load. In this application including specification and claims, various dimensions, positions and the like of the tire refer to those under the normally inflated unloaded condition of the tire unless otherwise noted.

The standard wheel rim means a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure means the "maximum air pressure" in JATMA, the "Inflation Pressure" in ETRTO, and the maximum pressure given in the "Tire Load Limits at various Cold Inflation Pressures" table in TRA or the like.

Referring to FIG. 1, the tire 1 in accordance with the present invention comprises a tread portion 2, a pair of sidewall portions 3 extending from axially both ends of the tread portion 2, a pair of bead portion 4 each with a bead core 5 therein, a carcass 6 extending between bead cores 5 through the tread portion 2 and sidewall portions 3 and a belt layer 7 disposed radially outside the carcass 6 in the tread portion 2.

Figure 2:
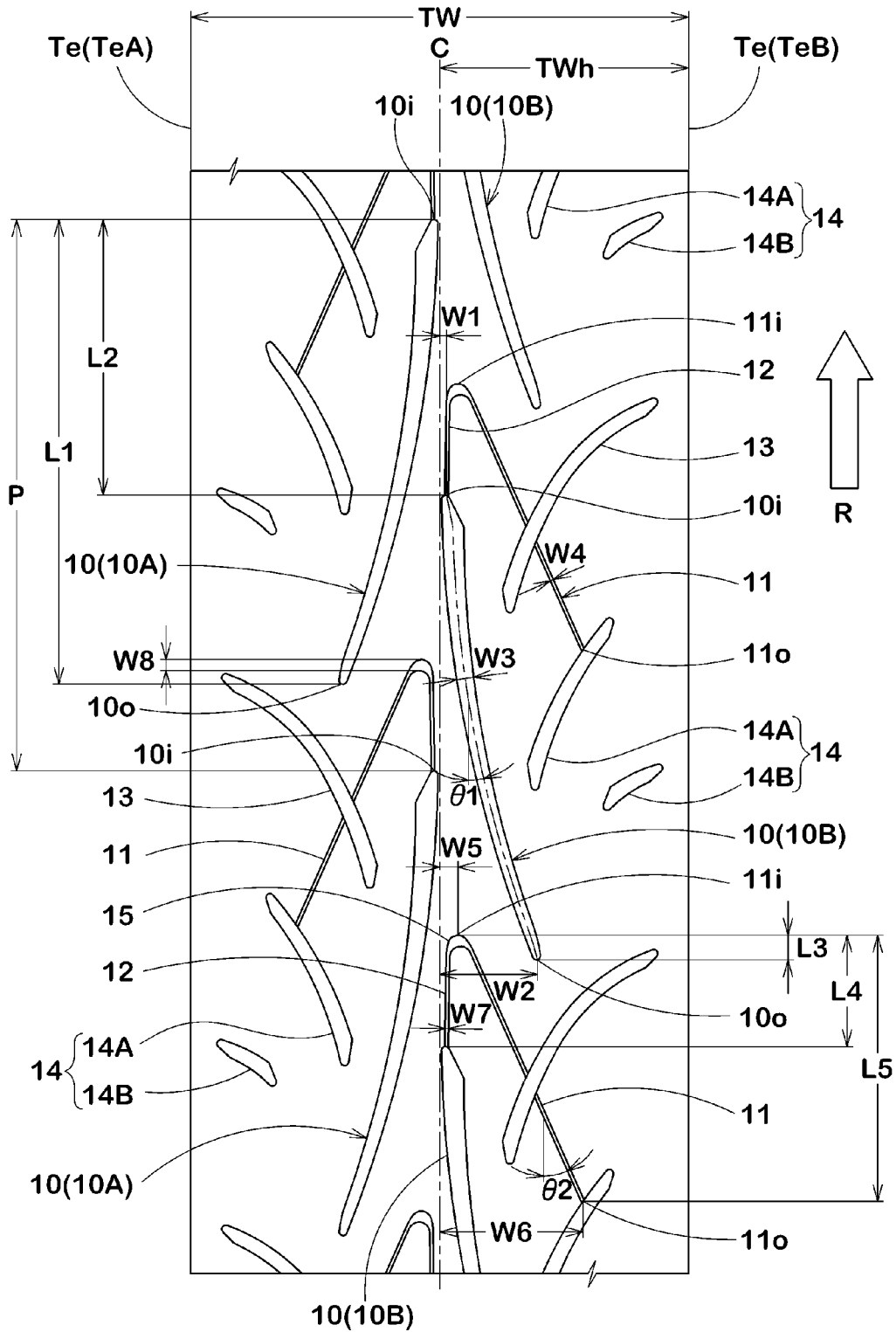
FIG. 2 is a development view of a tread portion of the tire of FIG. 1.

The tread portion 2 has a ground contact surface 2S extending between a pair of tread edges Te while curving in a convex arc-like manner to obtain a wide ground contact area during turning. Each tread edge Te is provided at the axially outmost end of the tire. The tread edges Te also define a tread width Tw which is an axial distance therebetween being a tire maximum width. Moreover, the tread edges Te include a first tread edge (TeA) and a second tread edge (TeB) in opposite side of the first tread edge (TeA), as shown in FIG. 2.

The carcass 6 includes two carcass plies 6A, 6B of cords arranged at an angle of from 65 to 90 degrees with respect to the tire equator C in this embodiment. Preferably, organic fiber cords such as rayon, nylon, polyester may be used for the carcass cord. Each carcass ply 6A, 6B comprises a main portion 6a extending between bead cores 5 and a pair of turn-up portions 6b each turned up around the bead core 5 from the axially inside to the outside of the tire. A bead apex rubber 8 is provided between the main portion 6a and the turned up portion 6b which extends and tapers radially outwardly from the bead core 5.

In this embodiment, the belt layer 7 comprises two belt plies 7A and 7B each having parallel cords arranged at angle of from 5 to 30 degrees with respect to the tire equator C so that the plies 7A and 7B cross each other. As the belt cords, high modulus organic fiber cords such as aramid, rayon can be preferably used. As the belt layer, a jointless ply in which a belt cord is spirally wound around a tire rotation axis may be used.

The ground contact surface 2S of the tread portion 2 includes a crown portion S1 that mainly comes into contact on the ground in straight running and a pair of shoulder portion S2 that are provided on both sides of the crown portion S1 so as to mainly come into contact on the ground during turning.

More specifically, the crown portion S1 means a region that comes into contact on the ground at the camber angle of zero under a normally inflated loaded condition that the tire 1 is mounted on the standard wheel rim and inflated to the standard pressure and loaded with a standard tire load. The shoulder portion S2 means an outside area of the crown portion S1 on the ground contact surface 2S.

Here, the standard tire load means the "maximum load capacity" in JATMA, the "Load Capacity" in ETRTO, and the maximum value given in the above-mentioned table in TRA or the like.

The land ratio Rc of the crown potion S1 is set ranging from 85 to 95% to maintain a basic heat dissipation characteristic and the rigidity of the tread portion 2. Namely, when the land ratio Rc of the crown portion S1 is less than 85%, the stability in straight running and a tire life tend to decrease due to low rigidity of the tread portion 2. On the other hand, when the land ratio Rc of the crown portion S1 is more than 95%, not only a thermal degradation of the tread portion 2 but also unsatisfactory wet performance tends to be brought.

Referring to FIG. 2, the tread portion 2 has a designated rotation direction which, for example, is identified using a character or a mark on the sidewall portion.

The tread portion 2 is provided with a plurality of inner inclined grooves 10 and a plurality of inclined narrow grooves 11 in each side of the tire equator C.

The inner inclined grooves 10 comprise: a plurality of first inner inclined grooves 10A which are circumferentially arranged at first pitches P, wherein each extends toward the first tread edge (TeA); and a plurality of second inner inclined grooves 10B which are circumferentially arranged at second pitches P (not shown), wherein each extends toward the second tread edge (TeB). In this embodiment, the first pitches and the second pitches are substantially the same.

The first inner inclined grooves 10A and the second inner inclined grooves 10B are alternately arranged in the circumferential direction of the tire to improve the wet performance while maintaining the rigidity of the tread portion 2. Preferably the phase difference L2 between the first inner inclined groove 10A and the second inner inclined groove 10B is in a range of from not less than 40%, more preferably not less than 45%, but preferably not more than 60%, more preferably not more than 55% of the first pitch P.

Each inner inclined groove 10A, 10B extends from an axially inner end 10i provided in the vicinity of the tire equator C to an axially outer end 10o toward an opposite direction to the designated rotation direction R.

Each inner inclined-groove 10A, 10B has a circumferential length L1 in a range of from 70 to 85% of the first pitch P to effectively prevent the thermal degradation of the crown portion S1 without deteriorating the ride comfort in straight running. Preferably, the length L1 is in a range of from 75 to 80% the first pitch P.

Referring to FIG. 2, the first pitch P is shown a circumferential distance between axially inner ends 10i, 10i of adjacent two first inner inclined grooves 10A, 10A. Preferably, the first pitch P is in a range of from not less than 5%, more preferably not less than 7%, but preferably not more than 15% and more preferably not more than 13% of a tread circumferential length on the tire equator C in order to maintain the wet performance, turning performance and the transient characteristic during turning of the tire.

The groove width W3 of the inner inclined groove 10 is not particularly limited. Preferably the groove width W3 is ranging from 3 to 8 mm in order to maintain the stability in straight running as well as the wet performance of the tire. The groove depth d1 of the inner inclined groove 10 is preferably ranging from 3 to 5 mm, in the same point of view above.

Preferably, the developed length W1 from the tire equator C to the axially inner end 10i of the inner inclined groove 10 is set in a range of from not more than 5% of a tread half developed-width Twh to reduce a rubber volume around the tire equator C for preventing the thermal degradation of the tread portion 2. Here, the tread half-developed width Twh is a length from the tire equator C to one of the tread edges Te along the ground contact surface 2S of the tread portion in a tire cross section including a tire rotate axis.

Preferably, the developed length W2 from the tire equator C to the axially outer end 10o of the inner inclined groove 10 is set in a range of from not less than 32%, more preferably not less than 34%, but preferably not more than 40%, more preferably not more than 38% of the tread half-developed width Twh, in order to further improve the turning performance as well as the thermal degradation resistance.

The inner inclined groove 10 has an angle θ1 in a range of from 0 to 20 degrees with respect to the circumferential direction of the tire to effectively drain the water under the tread portion 2 toward the circumferential direction of the tire for improving the wet performance.

In each side of the tire equator C, the inclined narrow groove 11 is provided in between circumferentially adjacent inner inclined grooves 10, 10 to increase the heat dissipation of the crown portion S1 of the tread portion 2.

The inclined narrow groove 11 extends from an axially inner end 11i to an axially outer end 11o thereof toward the opposite direction to the designated rotation direction R.

Preferably, the circumferential length L5 of the inclined narrow groove 11 is set in a range of from not less than 44%, more preferably not less than 46%, but preferably not more than 52%, more preferably not more than 50% of the first pitch P in order to maintain the heat dissipation and the rigidity of the tread portion 2.

The inclined narrow groove 11 has a groove width W4 in a range of from not less than 0.5 mm, preferably not less than 1.0 mm, but preferably not more than 2.0 mm, more preferably not more than 1.5 mm in order to maintain the heat dissipation and the rigidity of the tread portion 2. The groove depth d2 of the inclined narrow groove 11 is preferably set in a range of from not less than 0.3 mm, more preferably not less than 0.4 mm, but preferably not more than 0.7 mm, more preferably not more than 0.6 mm, in view of above.

Since the vicinity of the tire equator C in the crown portion S1 is the area that especially tends to generate heat, the axially inner end 11i of the inclined narrow groove 11 is located in a distance W5 within 10% of the tread half developed-width Twh from the tire equator C. Therefore, the heat dissipation of the crown portion S1 is effectively improved.

Preferably, the circumferential distance L3 between the axially inner end 11i of the inclined narrow groove 11 and the axially outer end 10o of the inner inclined groove 10 is set in a range of from not more than 10% of the first pitch P to further improve the heat dissipation so that the tire life extends.

In order to obtain the maximum effect in heat dissipation, each inclined narrow groove 11 is preferably provided in a center region between the inner inclined grooves 10 in each side of the tire equator C. In this point of view, the circumferential distance L4 between the axially inner end 11i of the inclined narrow groove 11 and the axially inner end 10i of the inner inclined groove 10 is preferably set in a range of from not less than 35%, more preferably not less than 38%, but preferably not more than 45%, more preferably not more than 42% of the phase difference L2, and thereby the center region of the tread portion 2 may have an improved heat dissipation.

The axially outer end 11o of the inclined narrow groove 11 is provided outside the crown portion 51. Accordingly, the air in the inclined narrow groove 11 is effectively exhausted outside of the tire from the crown portion S1 so that the heat dissipation of the crown portion S1 further improves.

Preferably, the developed length W6 from the tire equator C to the axially outer end 11o of the inclined narrow groove 11 is within 60%, more preferably within 58% of the tread half developed-width Twh in order to maintain the rigidity in the shoulder portions S2.

Moreover, the inclined narrow groove 11 has an angle θ2 with respect to the circumferential direction of the tire larger than that of the inner inclined groove 10. Since inclined narrow grooves 11 hardly make a contribution to the lateral rigidity of the tread portion 2 compared to inner inclined grooves, such an inclined narrow groove 11 brings neither the deterioration in turning performance nor deterioration in the transient characteristic during turning.

Preferably, the angle θ2 is set in a range of from not less than 22 degrees, more preferably not less than 24 degrees, but preferably not more than 28 degrees, more preferably not more than 26 degrees with respect to the circumferential direction of the tire to further maintain the lateral rigidity of the shoulder portion S2 as well as the circumferential rigidity of the crown portion S1.

Here, if the difference between angles θ1 and θ2 is too large, the transient characteristic during turning of the tire tends to deteriorate, and thereby the turning performance thereof also tends to deteriorate. From this point of view, the difference between angles θ1 and θ2 is preferably within 10 degrees.

Although the inclined narrow groove 11 in this embodiment extends in straight, the inclined narrow groove 11 is not particularly limited above. The inclined narrow groove 11, for example, may be curved so that the angle θ2 thereof gradually increases from the inner end 11i to the outer end 11o. Since such a curved inclined narrow groove 11 enhances the circumferential rigidity in the crown portion S1 as well as the lateral rigidity in the shoulder portion S2, and thereby an improved stability in straight running as well as turning performance may be obtained.

The tread portion 2 is further provided with a narrow groove 12 extending so as to connect between the axially inner end 10i of the inner inclined groove 10 and the axially inner end 11 of the inclined narrow groove 11. Such a narrow groove 12 may enhance the heat dissipation in the crown portion S1 and the wet grip performance while maintaining the circumferential rigidity in the crown portion S1.

Preferably, the groove width W7 of the narrow groove 12 is set in arrange of from not less than 0.5 mm, more preferably not less than 1.0 mm, but preferably not more than 2.0 mm, more preferably not more than 1.5 mm in order to maintain the rigidity of the tread portion 2, the heat dissipation and the drainage performance of the tire. In the same point of view, the groove depth d3 of the narrow groove 12 is preferably set in a range of from not less than 0.3 mm, more preferably not less than 0.4 mm, but preferably not more than 0.7 mm, more preferably not more than 0.6 mm.

The narrow groove 12 includes a connected portion 15 which is connected to the axially inner end 1oi of the inner inclined groove 10 and has a groove width W8 greater than that of the inclined narrow groove 11. The narrow groove 12 further may improve the heat dissipation of the tread portion 2 as well as the drainage performance of the tire.

In order to further improve the effects above, the groove width W8 of the connected portion 15 is preferably set in a range of from not less than 2.5 mm, more preferably not less than 3.0 mm, but preferably not more than 4.5 mm, more preferably not more than 4.0 mm.

Figure 3:
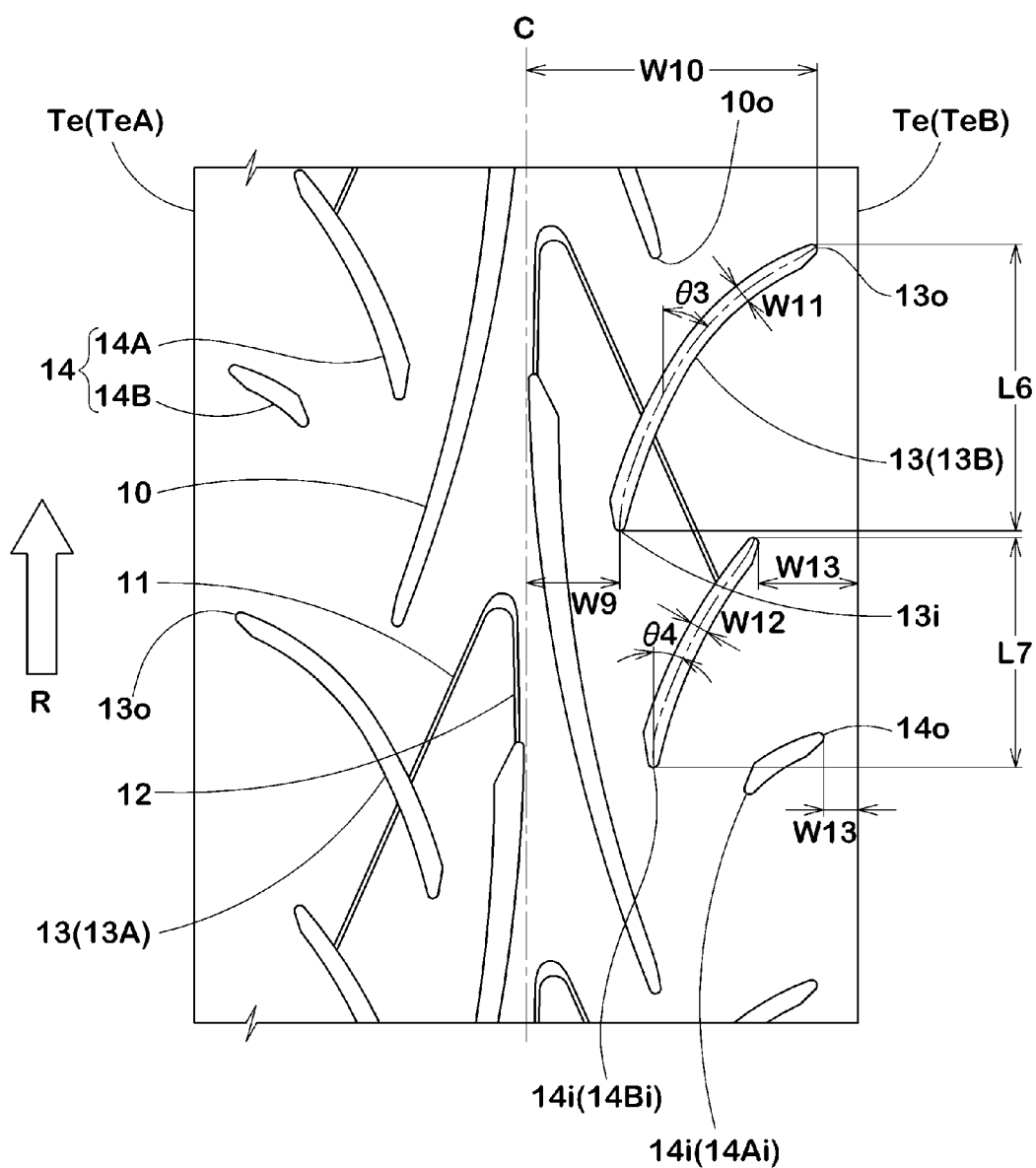
FIG. 3 is a partial enlarged view of FIG. 2.

FIG. 3 shows an enlarged view of the tread portion 2. Referring to FIG. 3, the tread portion 2 is further provided with a plurality of outer inclined grooves 13 and a plurality of outer inclined sub-grooves 14.

Each outer inclined groove 13 extends from an axially inner end 13i thereof to an axially outer end 13o thereof toward the designated rotation direction R. The axially inner end 13i of the outer inclined groove 13 is located axially inside the axially outer end 10o of the inner inclined groove 10. Such an outer inclined groove 13 may improve the drainage performance of the tire while maintaining the tread rigidity in well-balance.

The circumferential length L6 of the outer inclined groove 13 is preferably set in a range of from not less than 40%, more preferably not less than 43%, but preferably not more than 50%, more preferably not more than 47% of the circumferential length L1 of the inner inclined groove 10 in order to further improve the drainage performance and stability during turning of the tire.

Preferably, the groove width W11 of the outer inclined groove 13 is set in a range of from 2.5 to 4.0 mm in order to further improve the drainage performance on wet road as well as the turning performance. In the same point of view, the groove depth d4 of the outer inclined groove 13 is preferably set in a range of from 2.5 to 2.5 mm.

The axially inner end 13i of the outer inclined groove 13 is located in the side of tire equator C than the axially outer end 10o of the inner inclined groove 10. Such an outer inclined groove 13 further improves the drainage performance during turning with a small camber angle. Preferably, the developed length W9 from the tire equator C to the axially inner end 13i is set in a range of from not less than 24%, more preferably not less than 26%, but preferably not more than 32%, more preferably not more than 30% of the tread half developed-width Twh to maintain the rigidity in the crown portion S1 as well as the drainage performance during turning of the tire.

The developed length W10 from the tire equator C to the axially outer end 13o of the outer inclined groove 13 is preferably set in a range of from not less than 85%, more preferably not less than 88%, but preferably not more than 95%, more preferably not more than 92% in order to improve the drainage performance during turning while maintaining the turning performance with a large camber angle.

Preferably, the outer inclined groove 13 has an angle θ3 in a range of from not less than 20 degrees, more preferably not less than 30 degrees, but preferably not more than 60 degrees, more preferably not more than 50 degrees with respect to the circumferential direction of the tire in order to maintain the lateral rigidity of the shoulder portion S2 and to improve the drainage performance with the tire rotation. In this embodiment, the angle θ3 of the outer inclined groove 13 is gradually increasing from the axially inner end 13i thereof toward the axially outer end 13o thereof so that the circumferential rigidity of the center side of the tread portion 2 is maintained without decreasing the lateral rigidity in the vicinity of the tread edges Te.

The heat dissipation in the shoulder portions S2 is accelerated due to the airflow in the outer inclined groove 13 so that the tire 1 may continuously run. Since the outer inclined groove 13 has the groove width and depth each larger than those of the inclined narrow groove 11, the amount of air flow in the outer inclined groove 13 is also increased. Accordingly, the outer inclined groove 13 is preferably provided so as to communicate with the inclined narrow groove 11 in order to further increase the heat dissipation of the crown portion S1. More preferably, the inclined narrow groove 11 is provided so as to cross to the outer inclined groove 13.

The outer inclined grooves 13 includes a first outer inclined grooves 13A having the axially outer end 13o disposed in the vicinity of the first tread edge (TeA) and a second outer inclined grooves 13B having the axially outer end 13o disposed in the vicinity of the second tread edge (TeB). The first and second outer inclined grooves 13A, 13B are alternately arranged in the circumferential direction of the tire for improving the transient characteristic during turning due to maintain the rigidity in well-balance of the tread portion 2.

Referring to FIG. 3, the outer inclined sub-grooves 14 are provided between circumferentially adjacent outer inclined grooves 13 in each side of the tire equator C. In this embodiment, two outer inclined sub-grooves 14A, 14B having different lengths are provided in each between circumferentially adjacent outer inclined grooves 13, 13 in each side of the tire equator C to improve the heat dissipation and the drainage performance on the shoulder portion S2. Each outer inclined sub-groove 14 extends from an axially inner end 14i thereof to an axially outer end 14o thereof toward the designated rotation direction R of the tire.

Preferably, the outer inclined sub-groove 14 has a circumferential length L7 in a range of from not less than 8%, more preferably not less than 15%, but preferably not more than 36%, more preferably not more than 30% the length L1 of the inner inclined groove 10 so that the drainage performance and the transient characteristic during turning of the tire are improved.

Preferably, the outer inclined sub-groove 14 has a groove width W12 in a range of from 2.5 to 4.0 mm in order to improve the turning performance, thermal degradation and drainage performance. In the same point of view, the groove depth d5 thereof is preferably set in a range of from 2.5 to 3.5 mm.

The axially inner end 14i of the outer inclined sub-groove 14 is provided at an axial position that equals to the axially outer end 10o of the inner inclined groove 10, or the axially outward of the axially outer end 10o of the inner inclined groove 10. In this embodiment, the axially inner end 14Ai of the outer inclined sub-groove 14A is provided at the axial position that equals to the axially outer end 10o of the inner inclined groove 10, and the axially inner end 14Bi of the outer inclined sub-groove 14B having a length smaller than that of the sub-groove 14A above is provided in axially outward of the axially outer end 10o of the inner inclined groove 10. Accordingly, the necessary drainage performance of the tire may be obtained based on the camber angle thereof.

The axially outer end 14o of the outer inclined sub-groove 14 is located in an axially developed length W13 not less than 8%, more preferably not less than 15%, preferably not more than 30% and more preferably not more than 25% the tread half developed-width Twh from the tread edge Te so that the turning performance at the maximum camber angle and the drainage performance of the tire are further improved.

Preferably, the outer inclined sub-groove 14 has an angle θ4 with respect to the circumferential direction of the tire in a range of from not less than 25 degrees, more preferably not less than 40 degrees, but preferably not more than 60 degrees, more preferably not more than 50 degrees so that the transient characteristic during turning and the drainage with the tire rotation are improved.

Preferably, the axially outer end 11o of the narrow inclined groove 11 is connected to the outer inclined sub-groove 14 in order to increase the airflow in the narrow inclined groove 11 so that the thermal degradation of the crown portion S1 may be prevented.

The present invention is more specifically described and explained by means of the following Examples and References. It is to be understood that the present invention is not limited to these Examples.

Comparison Test

Motorcycle tires for a rear wheel each having a basic internal structure of FIG. 1 and a basic tread pattern of FIG. 2 except for the detail shown in Table 1 were made and tested. Major common specifics of tires are as follows. Tire size
    Front: 120/70ZR17
    Rear: 180/55ZR17
    Rim Size
    Front: 17xMT3.50
    Rear: 17xMT5.50
    Inflation Pressure:
    Front: 250 kPa
    Rear: 290 kPa Each test tire was installed in the rear wheel of a motorcycle having a 600 cc displacement. A test driver drove the motorcycle on a test course of 3700 m long, and evaluated the tire life, thermal degradation resistance of the tread portion, turning performance, feeling during initial turning, transient characteristic during turning and wet performance based on the standard as follows. Each test result was shown as a score. The greater the score, the better the performance is.

Tire Life:
    The tire life of each tire was evaluated based on groove depths of inner inclined grooves after traveling on the test course few times.

Thermal Degradation Resistance:
    The thermal degradation resistance of each tire was evaluated based on the degree of decrease in running performance of the tire during traveling on the test course.

Turning Performance:
    The turning performance of each tire was evaluated based on the stability of the motorcycle during turning.

Feeling During Initial Turning:
    The feeling during initial turning of each tire was evaluated based on the driver's feeling at the moment that a camber angle was given to the motorcycle.

Transient Characteristic During Turning:
    The transient characteristic during turning was evaluated based on the degree of change in camber thrust during turning up to the full banked state of the motorcycle.

Wet Performance:
    The wet performance was evaluated based on the driver's feeling on the test course having a wet road.

Test results are shown in Table 1

TABLE 1

| | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ref. 4 |
|---|---|---|---|---|---|---|---|---|---|---|---|---|
| Tread half developed-width TWh (mm) | 80 | 80 | 80 | 80 | 80 | 80 | 80 | 80 | 80 | 80 | 80 | 80 |
| First pitch P (mm) | 185 | 185 | 185 | 185.0 | 185 | 185 | 185 | 185 | 185 | 185 | 185 | 185 |
| Ratio W1/TWh (%) | −12.5 | 7.5 | 1.3 | 1.3 | 3.8 | 1.3 | 1.3 | 0 | 5 | 1.3 | 1.3 | 1.3 |
| Angle θ1 (deg.) | 160 | 15 | 15 | 15 | 15 | 15 | 15 | 15 | 15 | 5 | 20 | 25 |
| Ratio L1/P (%) | 45.9 | 81.1 | 81.1 | 81.1 | 81.1 | 81.1 | 81.1 | 81.1 | 81.1 | 81.1 | 81.1 | 81.1 |
| Ratio L2/P (%) | 48.6 | 48.6 | 48.6 | 48.6 | 48.6 | 48.6 | 48.6 | 48.6 | 48.6 | 48.6 | 48.6 | 48.6 |
| Ratio W5/TWh (%) | — | 1.1 | 2.5 | 2.5 | 2.5 | 6.3 | 2.5 | 2.5 | 2.5 | 2.5 | 2.5 | 2.5 |
| Angle θ2 (deg.) | — | 25 | 25 | 25 | 25 | 25 | 25 | 25 | 25 | 25 | 25 | 25 |
| Groove width W4 (mm) | — | 1 | 3 | 1 | 1 | 1 | 2 | 1 | 1 | 1 | 1 | 1 |
| Ratio L3/P (%) | — | 2.3 | 2.3 | 2.3 | 2.3 | 2.3 | 2.3 | 2.3 | 2.3 | 2.3 | 2.3 | 2.3 |
| Ratio W10/TWh (%) | — | 90 | 90 | 90 | 90 | 90 | 90 | 90 | 90 | 90 | 90 | 90 |
| Land ratio Rc of crown portion (%) | 82 | 93 | 85 | 89 | 91 | 90 | 88 | 87 | 92 | 89 | 89 | 89 |
| Tire life (Score) | 4 | 10 | 6 | 8 | 9 | 9 | 7 | 7 | 10 | 6 | 8 | 10 |
| Thermal degradation resistance (Score) | 10 | 5 | 9 | 8 | 7 | 7 | 9 | 9 | 7 | 10 | 8 | 7 |
| Turning performance (Score) | 9 | 5 | 8 | 8 | 8 | 8 | 8 | 8 | 8 | 5 | 7 | 4 |
| Feeling during initial turning (Score) | 4 | 5 | 5 | 8 | 8 | 7 | 7 | 7 | 8 | 10 | 7 | 4 |
| Transient characteristic during turning (Score) | 9 | 3 | 7 | 8 | 8 | 7 | 8 | 8 | 6 | 4 | 8 | 9 |
| Wet performance (Score) | 8 | 6 | 9 | 8 | 7 | 8 | 8 | 8 | 7 | 10 | 7 | 4 |

| | Ref. 5 | Ex. 9 | Ex. 10 | Ref. 6 | Ex. 11 | Ex. 12 | Ex. 13 | Ex. 14 | Ex. 15 | Ref. 7 |
|---|---|---|---|---|---|---|---|---|---|---|
| Tread half developed-width TWh (mm) | 80 | 80 | 80 | 80 | 80 | 80 | 80 | 80 | 80 | 80 |
| First pitch P (mm) | 185 | 185 | 185 | 185 | 185 | 185 | 185 | 185 | 185 | 185 |
| Ratio W1/TWh (%) | 1.3 | 1.3 | 1.3 | 1.3 | 1.3 | 1.3 | 1.3 | 1.3 | 1.3 | 1.3 |
| Angle θ1 (deg.) | 15 | 15 | 15 | 15 | 15 | 15 | 15 | 15 | 15 | 15 |
| Ratio L1/P (%) | 65 | 70 | 85 | 90 | 81.1 | 81.1 | 81.1 | 81.1 | 81.1 | 81.1 |
| Ratio L2/P (%) | 48.6 | 48.6 | 48.6 | 48.6 | 48.6 | 48.6 | 48.6 | 48.6 | 48.6 | 48.6 |
| Ratio W5/TWh (%) | 2.5 | 2.5 | 2.5 | 2.5 | 2.5 | 2.5 | 0 | 5 | 10 | 15 |
| Angle θ2 (deg.) | 25 | 25 | 25 | 25 | 25 | 25 | 25 | 25 | 25 | 25 |
| Groove width W4 (mm) | 1 | 1 | 1 | 1 | 0.5 | 1.5 | 1 | 1 | 1 | 1 |
| Ratio L3/P (%) | 2.3 | 2.3 | 2.3 | 2.3 | 2.3 | 2.3 | 2.3 | 2.3 | 2.3 | 2.3 |
| Ratio W10/TWh (%) | 90 | 90 | 90 | 90 | 90 | 90 | 90 | 90 | 90 | 90 |
| Land ratio Rc of crown portion (%) | 89 | 89 | 91 | 93 | 89 | 89 | 85 | 85 | 85 | 85 |
| Tire life (Score) | 8 | 8 | 9 | 10 | 8 | 8 | 8 | 8 | 8 | 9 |
| Thermal degradation resistance (Score) | 4 | 6 | 10 | 10 | 7 | 9 | 8 | 8 | 7 | 5 |
| Turning performance (Score) | 8 | 8 | 6 | 4 | 9 | 8 | 8 | 8 | 8 | 8 |
| Feeling during initial turning (Score) | 8 | 8 | 8 | 6 | 8 | 8 | 8 | 8 | 8 | 8 |
| Transient characteristic during turning (Score) | 8 | 7 | 6 | 4 | 8 | 8 | 8 | 8 | 8 | 8 |
| Wet performance (Score) | 6 | 8 | 8 | 7 | 7 | 8 | 8 | 8 | 7 | 5 |

| | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|
| Tread half developed-width TWh (mm) | 80 | 80 | 80 | 80 | 80 | 80 | 80 | 80 | 80 | 80 |
| First pitch P (mm) | 185 | 185 | 185 | 185 | 185 | 185 | 185 | 185 | 185 | 185 |
| Ratio W1/TWh (%) | 1.3 | 1.3 | 1.3 | 1.3 | 1.3 | 1.3 | 1.3 | 1.3 | 1.3 | 1.3 |
| Angle θ1 (deg.) | 15 | 15 | 15 | 15 | 15 | 15 | 15 | 15 | 15 | 15 |
| Ratio L1/P (%) | 81.1 | 81.1 | 81.1 | 81.1 | 81.1 | 81.1 | 81.1 | 81.1 | 81.1 | 81.1 |
| Ratio L2/P (%) | 48.6 | 48.6 | 48.6 | 48.6 | 48.6 | 48.6 | 48.6 | 48.6 | 48.6 | 48.6 |
| Ratio W5/TWh (%) | 2.5 | 2.5 | 2.5 | 2.5 | 2.5 | 2.5 | 2.5 | 2.5 | 2.5 | 2.5 |
| Angle θ2 (deg.) | 25 | 25 | 25 | 25 | 25 | 25 | 15 | 20 | 30 | 35 |
| Groove width W4 (mm) | 1 | 1 | 1 | 1 | 1 | 1 | 1 | 1 | 1 | 1 |
| Ratio L3/P (%) | 2.3 | 2.3 | 2.3 | 2.3 | 10 | 15 | 2.3 | 2.3 | 2.3 | 2.3 |
| Ratio W10/TWh (%) | 80 | 85 | 95 | 100 | 90 | 90 | 90 | 90 | 90 | 90 |
| Land ratio Rc of crown portion (%) | 89 | 89 | 89 | 89 | 89 | 89 | 89 | 89 | 89 | 89 |
| Tire life (Score) | 8 | 8 | 8 | 8 | 8 | 8 | 8 | 8 | 8 | 8 |
| Thermal degradation resistance (Score) | 8 | 8 | 8 | 8 | 8 | 7 | 8 | 8 | 8 | 8 |
| Turning performance (Score) | 7 | 8 | 7 | 6 | 8 | 8 | 7 | 8 | 8 | 7 |
| Feeling during initial turning (Score) | 8 | 8 | 8 | 8 | 7 | 7 | 8 | 8 | 8 | 7 |
| Transient characteristic during turning (Score) | 5 | 7 | 8 | 8 | 8 | 8 | 7 | 8 | 8 | 7 |
| Wet performance (Score) | 5 | 7 | 9 | 9 | 9 | 10 | 8 | 8 | 8 | 8 |

From the test results, it was confirmed that Example tires in accordance with the present invention can be effectively improved the thermal degradation resistance of tread portions while maintaining the turning performance as well as the tire life.

The invention claimed is:

1. A motorcycle tire including a tread portion having a designated rotation direction, comprising
the tread portion having a tread surface between a first tread edge and a second tread edge while curving in a convex arc-like manner and a tread width which is an axial distance between the first and second tread edges being a maximum tire width, and the tread portion being provided with a plurality of inner inclined grooves and a plurality of inclined narrow grooves, each said inner inclined groove extending from an axially inner end to an axially outer end toward an opposite direction to the designated rotation direction and having an angle of from 0 to 20 degrees with respect to a circumferential direction of the tire, and the axially inner end of the inner inclined groove located in a developed length within 5% of a tread half developed-width from a tire equator, said inner inclined grooves comprising a plurality of first inner inclined grooves circumferentially arranged at first pitches and each having the axially outer end toward the first tread edge and a plurality of second inner inclined grooves circumferentially arranged at second pitches and each having the axially outer end toward the second tread edge, and said first inner inclined grooves and said second inner inclined grooves alternately arranged in the circumferential direction of the tire, said each first inner inclined groove having a circumferential length of from 70 to 85% of first pitches, and said each second inner inclined groove having a circumferential length of from 70 to 85% of second pitches, said each inclined narrow groove provided between circumferentially adjacent inner inclined grooves in both sides of the tire equator, the inclined narrow groove having a groove width of from 0.5 to 2.0 mm, the inclined narrow groove extending an axially inner end to an axially outer end toward the opposite direction to the designated rotation direction and having an angle with respect to a circumferential direction of the tire larger than that of the inner inclined groove, and the axially inner end of the inclined narrow groove located in a developed length within 10% of the tread half developed-width, the axially outer end of the inclined narrow groove located outside a crown portion which comes into contact on a ground under a normally inflated loaded condition that the tire is mounted on a standard wheel rim and inflated to a standard pressure and loaded with a standard tire load at a camber angle of zero, and a land ratio of the crown portion of from 85 to 95%.

2. The tire according to claim 1, wherein the tread portion is provided with a plurality of outer inclined grooves, said each outer inclined groove extends from an axially inner end to an axially outer end toward the designated rotation direction, the axially inner end of the outer inclined groove is located axially inside the axially outer end of the inner inclined groove, and a developed length from the tire equator to the axially outer end of the outer inclined groove is in a range of from 85 to 95% the tread half developed-width.

3. The tire according to claim 2, wherein said inclined narrow groove is communicated with the outer inclined groove.

4. The tire according to claim 2, wherein said inclined narrow groove crosses the outer inclined groove.

5. The tire according to claim 1, wherein a circumferential length from the axially inner end of the inclined narrow groove to the axially outer end of the inner inclined groove is not more than 10% the first pitches.

6. The tire according to claim 1, wherein the tread portion is further provided with a narrow groove extending so as to connect between the axially inner end of the inner inclined groove and the axially inner end of the inclined narrow groove.

7. The tire according to claim 6, wherein the narrow groove includes a connected portion to the axially inner end of the inner inclined groove, and the connected portion has a groove width greater than that of the inclined narrow groove.

8. The tire according to claim 1, wherein a circumferential length between the axially inner end of the first inner inclined groove and the axially inner end of the second inner inclined groove is in a range of from 40 to 60% the first pitches.

9. The tire according to claim 1, wherein the inclined narrow groove has the angle of from 20 to 30 degrees with respect to the circumferential direction of the tire.

* * * * *